United States Patent [19]
Chuang

[11] Patent Number: 5,280,871
[45] Date of Patent: Jan. 25, 1994

[54] SECURING BASE

[76] Inventor: Ching-Pao Chuang, No. 120-18, Yu Che, Yu Che Li, Ma Tou Chen, Tainan Hsien, Taiwan

[21] Appl. No.: 953,215

[22] Filed: Sep. 30, 1992

[51] Int. Cl.⁵ .................................. F16M 11/14
[52] U.S. Cl. ........................ 248/516; 248/288.5; 248/181; 403/90
[58] Field of Search .............. 248/516, 181, 288.5; 403/90, 84, 104, 93

[56] References Cited

U.S. PATENT DOCUMENTS

| | | | |
|---|---|---|---|
| 282,551 | 8/1883 | McLean | 248/181 |
| 3,841,769 | 10/1974 | Bowerman | 403/90 |
| 4,620,813 | 11/1986 | Lacher | 248/181 |
| 4,974,802 | 12/1990 | Hendren | 248/288.5 |

FOREIGN PATENT DOCUMENTS 0445088  9/1991  European Pat. Off. ............ 248/371

Primary Examiner—Richard K. Seidel
Assistant Examiner—Allan M. Schrock
Attorney, Agent, or Firm—Morton J. Rosenberg; David I. Klein

[57] ABSTRACT

A securing base having a round base of three layers to support a pressing disc combined with a supporter, a shaft passing throught the pressing disc to engage the round base by means of threads, a ball at a bottom of a movable rod fitting in a spherical hole in an upper portion of the movable rod, the ball having a plurality of small holes for a pin end of the supporter to selectable in an angle needed.

1 Claim, 5 Drawing Sheets

SECURING BASE

BACKGROUND OF THE INVENTION

A conventional securing base for securing a thing such as a sunshade parasol, a drying pole, etc., as shown in FIG. 6, comprises a central rod 6, a fixed ring 7 provided on a lower portion of the rod 6 to pivotally unite with connecting several rods 9, and a movable ring 8 provided to connect several declined rods 10, which have bottom ends fixed on weights 12 and middle points pivotally connected with outer ends of the rods 9 to support the central rod 6.

This kind of conventional securing base is deemed to have drawbacks as follow.

1. Its assemblage is not simple, taking time.
2. It cannot be adjusted to correspond to an angle of the sunshine.
3. The weights it has are not convenient to move because of heavy weight.

SUMMARY OF THE INVENTION

This invention has been devised to improve a conventional securing base to secure a thing such as a large parasol, a drying pole, etc, aiming to give it with the following features.

1. It has a simple structure, saving material, time needed for assemblage or disassembly.
2. It has a base of a hollow round disc shape possible to be buried in sand in a beach and securable with long nails as shown in FIG. 4.
3. It has a ball at a bottom of a movable rod and the ball is provided with a plurality of holes for a locating pin end to selectably engage so as to adjust an angle of a parasol or a drying pole combined on it.

BRIEF DESCRIPTION OF DRAWINGS

The invention will be better understood by reference to the accompanying drawings, wherein.

DETAILED DESCRIPTION OF THE INVENTION

Figure 1:
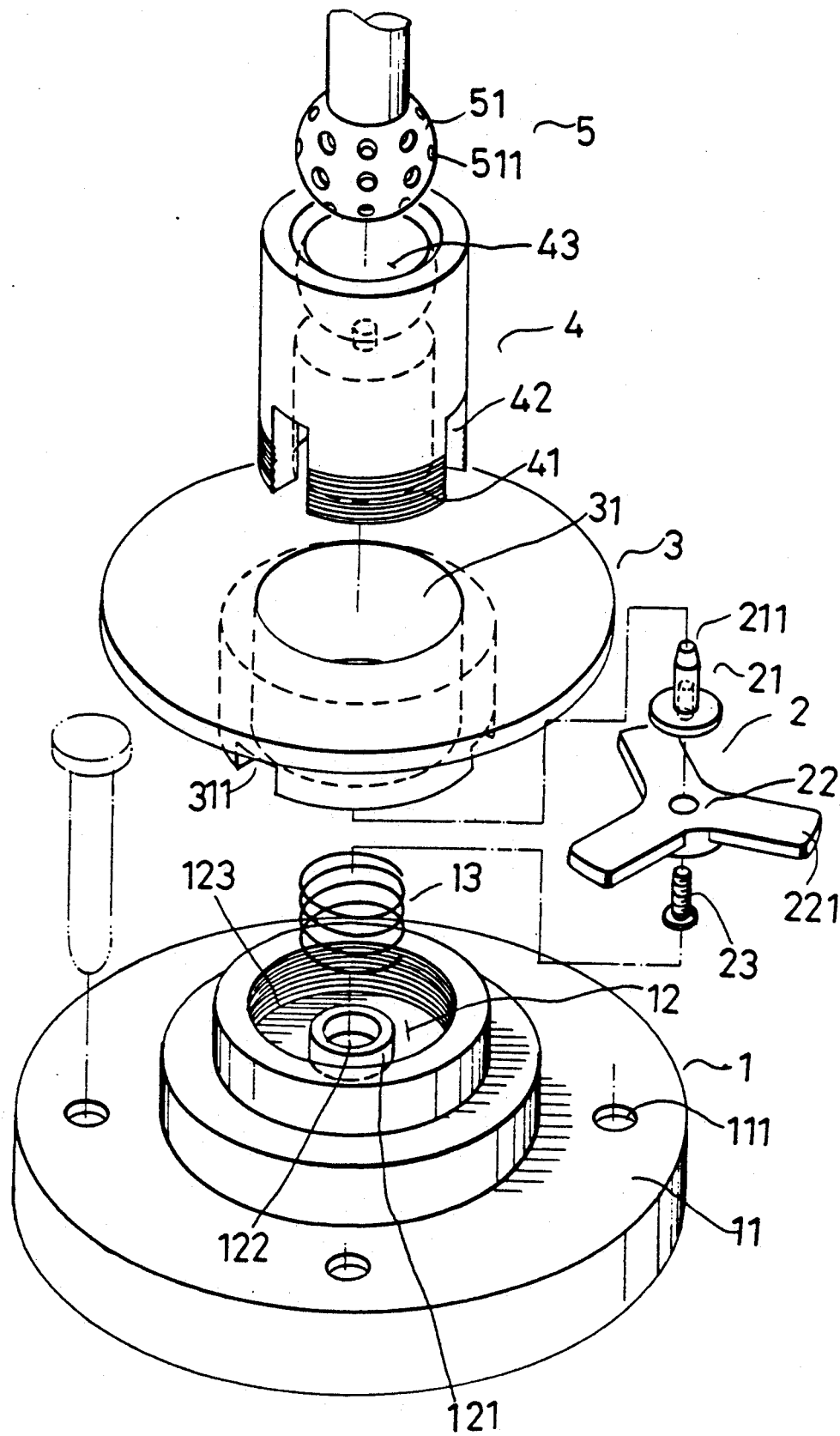
FIG. 1 is an exploded perspective of a securing base in the present invention.

A securing base in the present invention is applied to sustain a sunshade parasol, a drying pole for laundry, etc, comprises a base 1, a supporter 2, a pressing disc 3, a shaft 4 and a movable rod 5 as main components as shown in FIG. 1.

The base 1 is shaped round, having a lower portion with an annular surface 11 and a plurality of through holes 111 spaced apart equally therein, an intermediate portion, an upper portion bored with a central hole 12, an annular projecting-up wall 121 on the bottom of the hole 12, and a central hole 122 surrounded by the wall 121. The lower portion of base 1 has a diameter greater than the intermediate portion and the intermediate portion has a diameter greater than the upper base portion defining a cross-sectional stepped contour. A coil spring 13 is placed on the bottom of the hole 12, fitting around the annular wall 121 to contact the bottom of the pressing disc with its upper end so as to be compressed resiliently by the pressing disc.

The supporter 2 includes a locating pin 21 of T-shape, a trident member 22 and a screw 23 combined together. The trident member 22 has several prongs 22 radially extending horizontally from the center. The locating pin 21 has a functional end 211 of corn shape and a threaded hole for the screw 23 to engage therein to combine the trident member 22 with the locating pin 21 fixedly together.

The pressing disc 3 is shaped as a large round disc with an annular case extending downward from the round disc, a central hole 31 provided to go through the disc and the case and several radial grooves 311 in the bottom of the case for the prongs 221 of the trident member 22 to fit therein.

The shaft 4 is shaped cylindrical to fit in the central hole 31 in the pressing disc 3, having a male thread in a lower end to engage the female thread 123 in the base 1, several slots 42 equally space apart in the lower end to engage the prongs 221 of the trident member 22 in the supporter 2, and a spherical hole 43 for a ball 51 of the movable rod 5 to fit in.

The movable rod 5 has a ball 51 fixed at its bottom, and the ball 51 is provided with a plurality of holes 511 orderly and equally spaced apart in the surface for the functional end 211 of the locating pin 21 of the supporter 3 to selectably engage one of them to keep the movable rod 5 secured in an angle needed.

Figure 3:
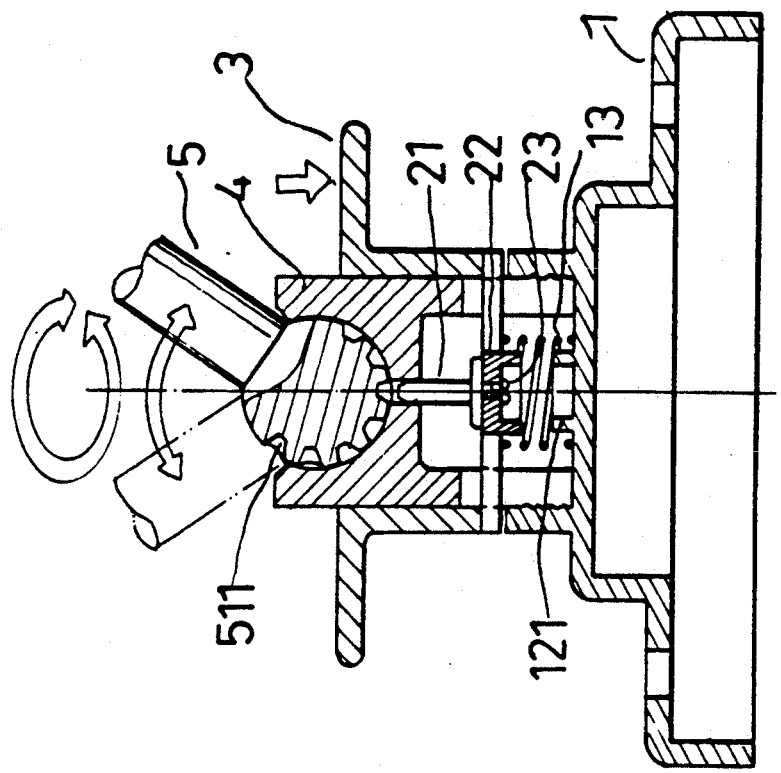
FIG. 3 is a cross-sectional view of a movable rod being moved in the securung base in the present invention.
Figure 2:
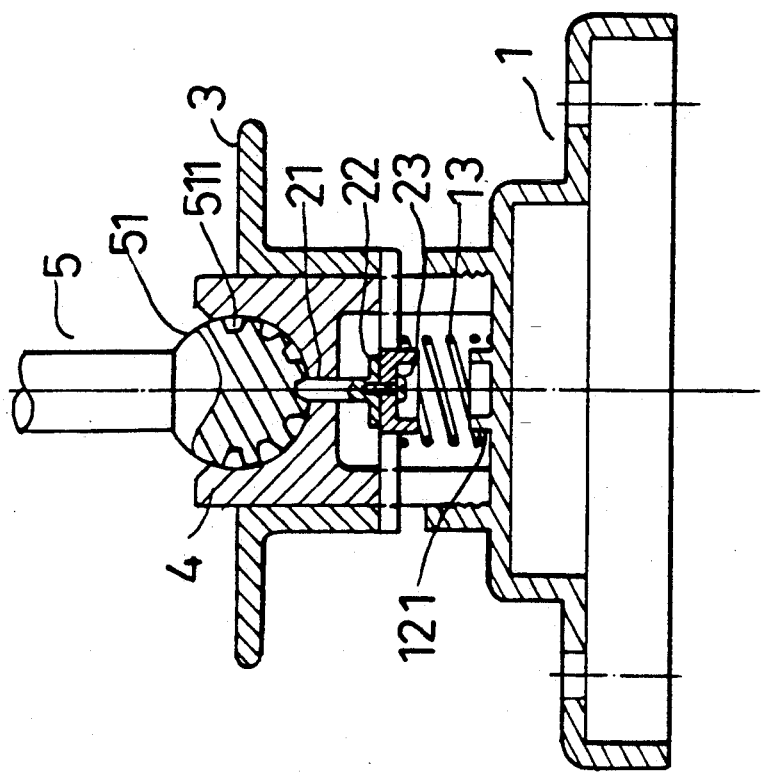
FIG. 2 is a cross-sectional view of the securing base in the present invention.

In assembling, as shown in FIGS. 2 and 3, the supporter 3 is to be placed on the coil spring 13 placed in the base 1, the pressing disc 3 is to be put on the supporter 3, letting the radial grooves 311 engage the prongs 221 of the supporter 2. Next, the shaft 4 is inserted in the central hole 31 in the pressing disc 3, letting the slots 421 engage the prongs 221, and screwing the male thread 41 with the female thread 123 to secure the pressing disc 3.

Figure 4:
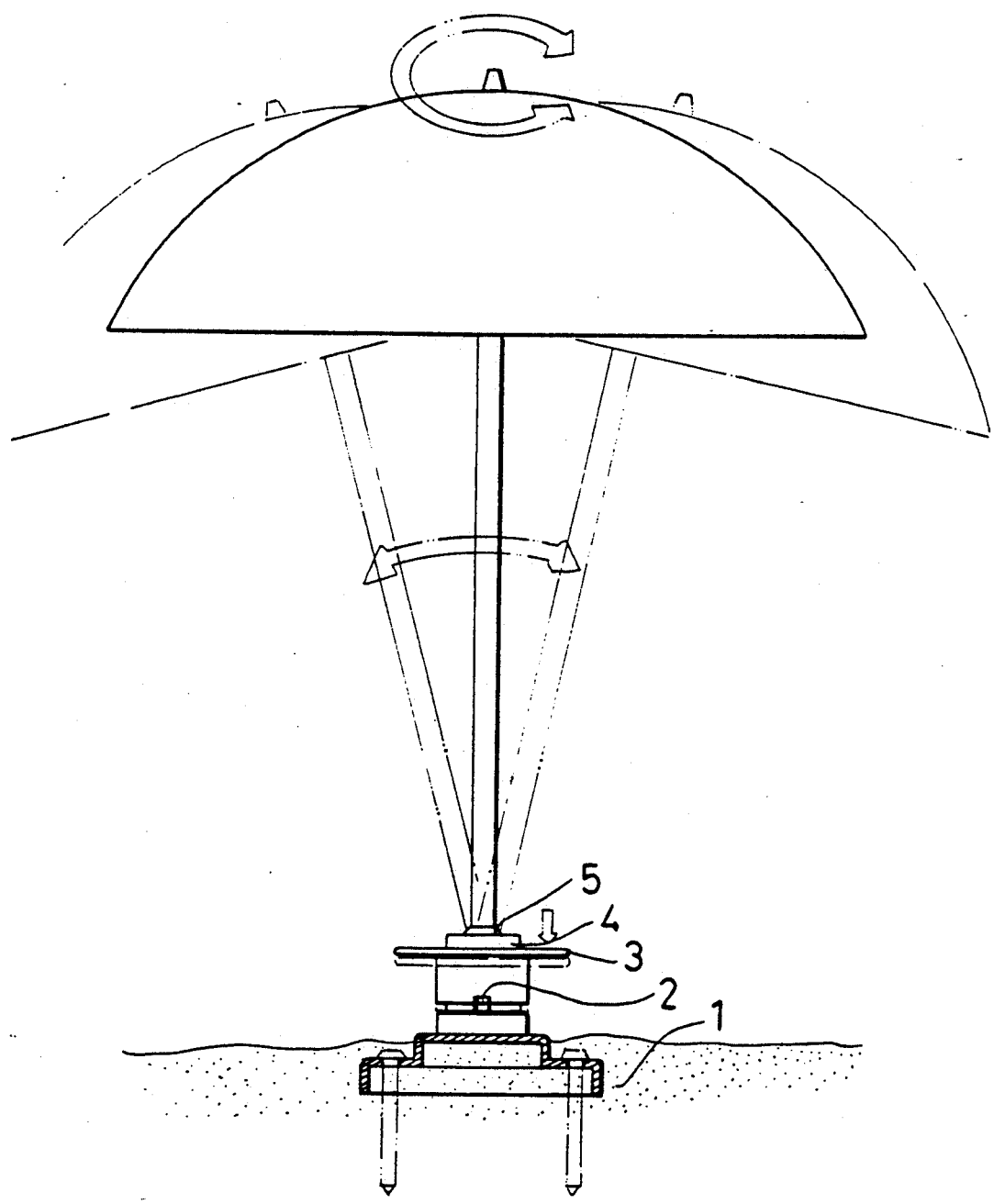
FIG. 4 is a side view of a sunshade parasol sustained with the securing base in the present invention.
Figure 5:
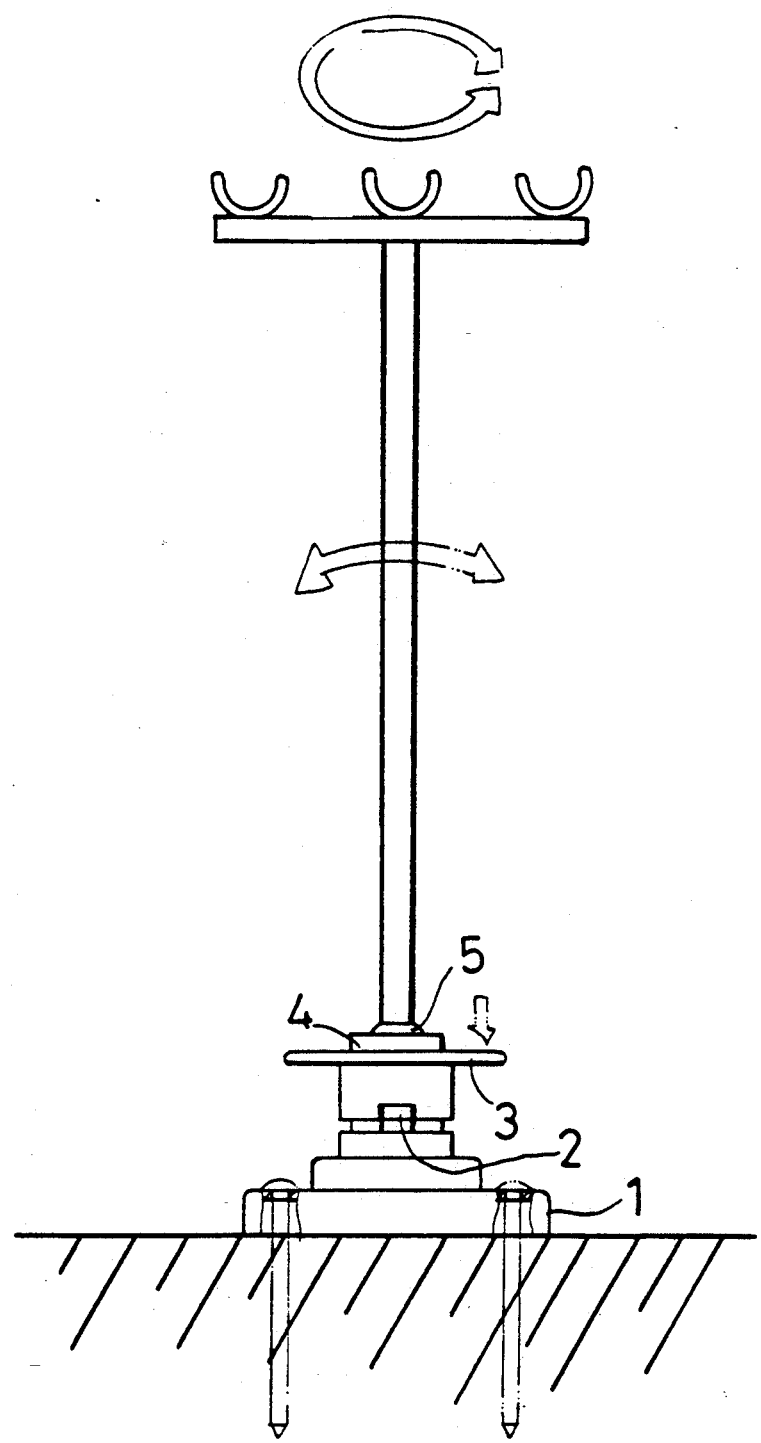
FIG. 5 is a side view of a drying pole sustained with the securing base in the present invention; and, FIG. 6 is a side view of a conventional securing base.
Figure 6:
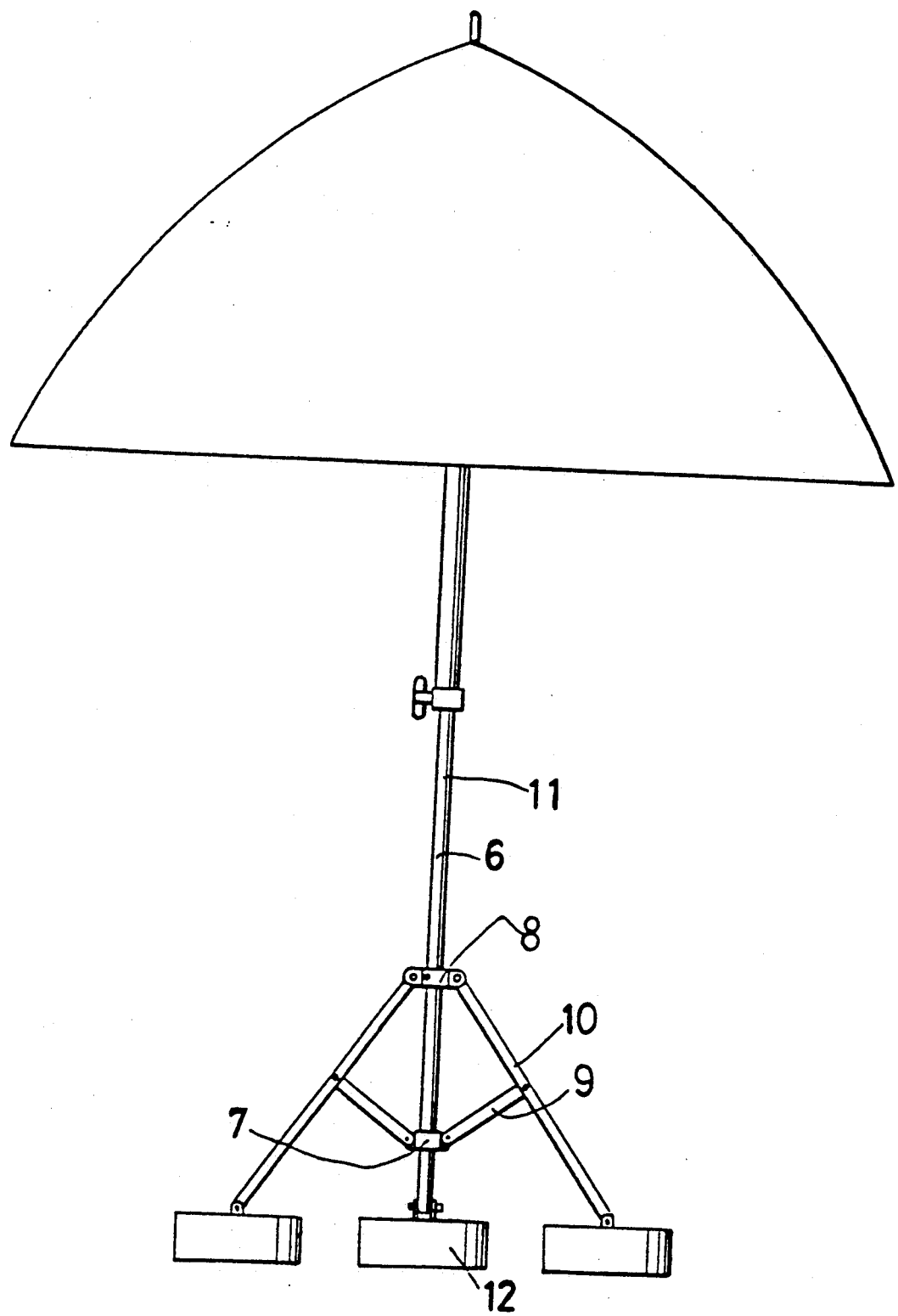

In handling, as shown in FIGS. 3, 4 and 5, the pressing disc 3 is to be pressed, forcing the coil spring 13 compress to release the locating pin 21 of the supporter 2 from one of the holes 511 in the ball 51 of the movable rod 5. Then the movable rod 5 is adjusted in its angle to correspond to a thing to be supported, then the locating pin 21 is to be made to engage in one of the holes 511 to secure the thing in the angle adjusted on this base.

While the preferred embodiments of the invention have been described above, it will be recognined and understood that various modifications may be made therein and the appended claims are intended to cover all such modifications which may fall within the spirit and scope of the invention.

What is claimed is:

1. A securing base for adjustably securing an extending member thereto, comprising:

a base having a circular cross-sectional contour defining a lower portion, an intermediate portion formed on the lower portion, an upper portion formed on the intermediate portion, said lower portion having a larger diameter with respect to said intermediate portion and said intermediate portion having a diameter greater than said upper portion, said lower portion having a plurality of holes formed therethrough and equally spaced apart each with respect to the other, a central hole formed in the upper portion, an annular wall defining a recess formed within said central hole, a coil spring positionally located around said annular wall;

a supporter including a locating pin, a trident member and a screw, said locating pin having a cone-shaped top end and a threaded hole for threaded engagement with said screw for securing the locating pin to the trident member, said trident member having a plurality of prongs equally spaced apart each from the other;

a pressing disc having an upper disc portion and a lower case portion formed under the upper disc portion, a central hole being formed through both the upper disc portion and the lower case portion and a plurality of radially extending grooves formed at a lower end of the lower case portion, said central hole engaging with a cylindrical shaft having a male thread and a plurality of equally spaced apart slots within a bottom end portion, said cylindrical shaft having a spherically shaped hole in an upper end portion, said slots and said grooves engaging with the trident member in the lower case portion; and, a movable rod having a ball member formed at a bottom end thereof for insertion into the spherically shaped hole in the cylindrical shaft, said ball having a plurality of holes equally spaced apart each from the other for the cone-shaped upper end of the locating pin in the supporter to selectively fit therein, said pressing disc being displaceable to compress the coil spring for releasing the locating pin from one of the holes in the ball member of the movable rod so that the movable rod can be positionally adjusted to an angle for securing said extending member to said securing base.

* * * * *